United States Patent
Zheng et al.

(10) Patent No.: US 8,149,757 B2
(45) Date of Patent: Apr. 3, 2012

(54) BANDWIDTH EFFICIENT HARQ SCHEME IN RELAY NETWORK

(75) Inventors: Haihong Zheng, Coppell, TX (US); Yousuf Saifullah, Flower Mound, TX (US); Yogesh Swami, Irving, TX (US); JianZhong Zhang, Irving, TX (US)

(73) Assignee: Nokia Corporation, Espoo (FI)

( * ) Notice: Subject to any disclaimer, the term of this patent is extended or adjusted under 35 U.S.C. 154(b) by 983 days.

(21) Appl. No.: 11/653,904

(22) Filed: Jan. 17, 2007

(65) Prior Publication Data

US 2007/0190933 A1  Aug. 16, 2007

Related U.S. Application Data (60) Provisional application No. 60/759,021, filed on Jan. 17, 2006.

(51) Int. Cl.
  *H04B 7/14*    (2006.01)
  *H04B 7/185*   (2006.01)
  *H04B 3/36*    (2006.01)
  *H04B 7/15*    (2006.01)
  *H04J 1/10*    (2006.01)
  *H04J 3/08*    (2006.01)
  *H04W 40/00*   (2009.01)

(52) U.S. Cl. ............ 370/315; 370/316; 370/279; 455/7; 455/11.1; 455/445

(58) Field of Classification Search ............. 455/7, 11.1, 455/445, 13.1, 517, 16; 370/315, 279, 329, 370/316

See application file for complete search history.

(56) References Cited

U.S. PATENT DOCUMENTS 5,473,602 A * 12/1995 McKenna et al. ............. 370/256
2009/0003378 A1 * 1/2009 Sachs ............................ 370/466

FOREIGN PATENT DOCUMENTS

JP    2002-314598 A   10/2002
WO    WO 03/069837     8/2003

OTHER PUBLICATIONS

International Search Report, PCT/IB2007/000116, Filed Jan. 17, 2007.
A Novel Multi-Hop ARQ Concept, Henning Wiemann, et al., 2005 IEEE $61^{ST}$ vol. 5, May 30-Jun. 1, 2005, pp. 3097-3101.
HARQ with Relays, IEEE C802.16 Presentation Submission Template (Rev. 8.3), Nov. 11, 2006, Haihong Zheng, et al., pp. 1-12.
Japanese Office Action, Notice of Reasons for Rejection application No. 2008-550866 dated May 17, 2011.
Japanese Office Action, dated Sep. 29, 2011, in corresponding Japanese Application No. 2008-550866.

* cited by examiner

*Primary Examiner* — Wesley Kim
(74) *Attorney, Agent, or Firm* — Squires Sanders (US) LLP (57) ABSTRACT

The present invention provides an enhanced H-ARQ scheme that optimizes bandwidth utilization and spectrum efficiency. When an H-ARQ attempt is unsuccessful due to loss or error over a hop between the BS and MS/SS, then only the first node in the hop chain that fails to decode the packet transmits another H-ARQ attempt. The BS determines the first node that fails on decoding based on certain information such as the feedback information sent from the nodes on the path. The previous node of the failed node is then instructed to retransmit by the BS.

15 Claims, 11 Drawing Sheets

Fig. 1

PRIOR ART

BANDWIDTH EFFICIENT HARQ SCHEME IN RELAY NETWORK

BACKGROUND OF THE INVENTION

1. Field of the Invention

The present invention relates to wireless communications and, more specifically, to wireless relay networks.

2. Description of the Related Art

A wireless relay network is a multi-hop system in which end nodes, such as mobile stations (MS) and subscription stations (SS) are connected to the base station (BS) or access point (AP) via a relay station (RS). The traffic between the MS/SS and the BS/AP passes through and is processed by the relay station (RS).

Figure 1:
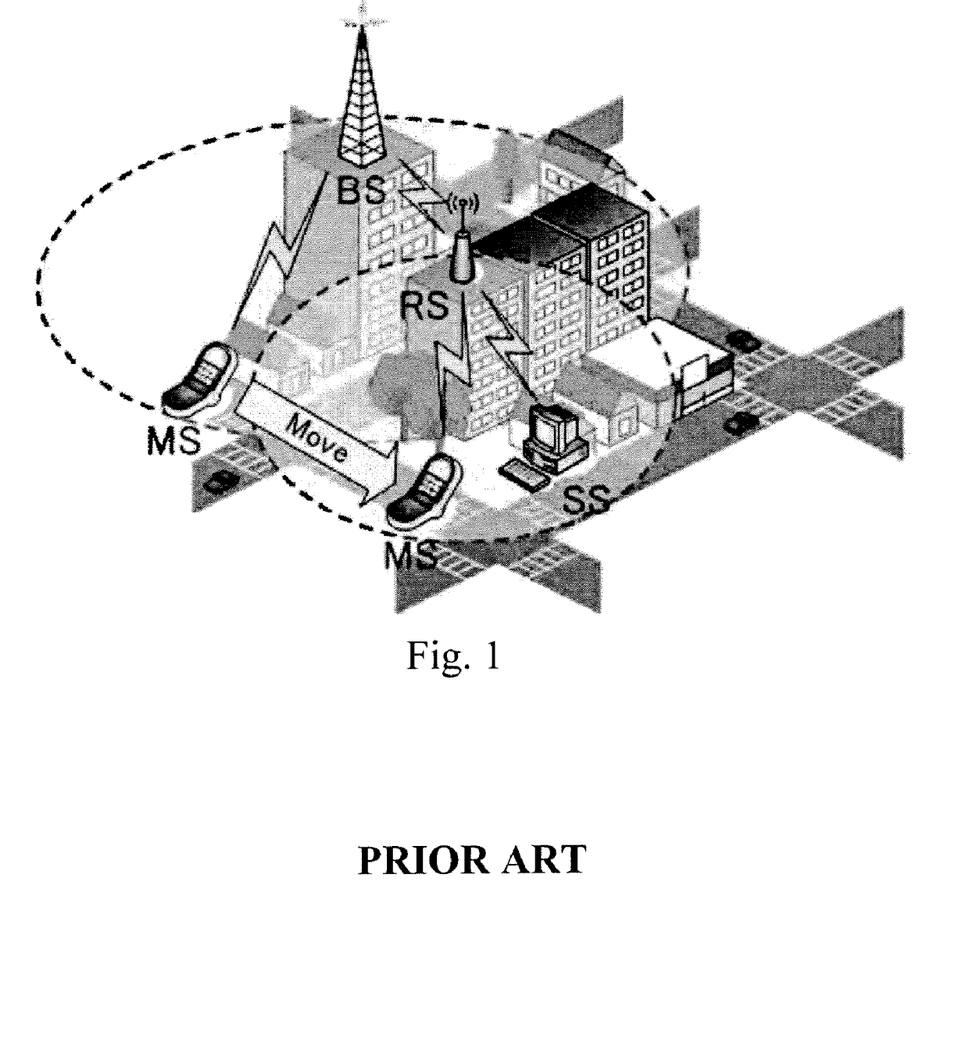
FIG. 1 illustrates an example of a wireless communications network according to an embodiment of the invention.

The 802.16 Mobile Multi-Hop Relay (MMR), a study item established in the IEEE 802.16 working group, provides examples of relay networking. The MMR working group focuses on defining a network system that utilizes relays stations (RS) to extend the network coverage and/or enhance the system throughput. FIG. 1 illustrates an exemplary relay network which comprises, in part, a relay station (RS), mobile station (MS), subscriber station (SS) and base station (BS).

Hybrid automatic repeat request (H-ARQ) is a scheme which combines ARQ protocols with forward-error-correcting (FEC) schemes that are generally considered to be the best error-control techniques for wireless links. Different wireless technology may have different H-ARQ schemes.

In IEEE 802.16, the H-ARQ scheme is implemented as a part of the media access controller (MAC) and can be enabled on a per-terminal basis. Two main variants of H-ARQ are supported: chase combining and incremental redundancy (IR). For IR, the PHY layer encodes the H-ARQ generating four versions for the encoded H-ARQ attempts. Each H-ARQ attempt is uniquely identified using a H-ARQ attempt identifier (SPID). For chase combining, the PHY layer encodes the H-ARQ packet generating only one version of the encoded packet. As a result, no SPID is required for chase combining.

For downlink operation, the BS sends a version of the encoded H-ARQ packet to the MS/SS. The MS/SS attempts to decode the encoded packet on this first H-ARQ attempt. If the decoding is successful, the MS/SS sends an acknowledgement (ACK) to the BS. If the decoding is not successful, the MS/SS sends a non-acknowledgement (NAK) to the BS. In response, the BS will send another H-ARQ attempt to the MS/SS. The BS may continue to send H-ARQ attempts until the MS/SS successfully decodes the packet and sends an ACK.

The H-ARQ scheme works well in a system without a relay station (RS) where the H-ARQ scheme is applied directly between the BS and MS/SS. However, when a RS is introduced into the system, although H-ARQ is still implemented between the MS/SS and BS, the RS needs to forward all the H-ARQ attempts and ACK/NAKs between the MS/SS and BS.

Therefore, according to prior art solutions, if the first H-ARQ attempt is not sent successfully due to error or loss, another H-ARQ attempt needs to be sent until the MS/SS or BS successfully decodes it. Consequently, the subsequent H-ARQ attempt(s) must be transmitted over all the different hops (links) between the BS and MS/SS. Bandwidth is reallocated between BS and MS/SS for transmitting the subsequent H-ARQ attempt(s), even though some of the links may have already transferred the frame successfully. This results in bandwidth wastage and throughput loss. Thus, there is a need for an enhanced H-ARQ scheme with an improved utilization of network resources.

In view of the above, embodiments of the present invention provide an improved H-ARQ scheme which provides better bandwidth utilization. The invention can be applied to relay in various wireless technologies, such as WiMax MMR.

SUMMARY OF THE INVENTION

The present invention provides, in one embodiment, a method of communication in a wireless relay network. The method includes sending an H-ARQ attempt from a base station to a relay station, from a mobile station to a relay station, or between relay stations. The attempt may include a packet and the relay station makes an effort to decode the packet. The method further includes forwarding the attempt to a mobile station or base station and decoding the packet at the mobile station or base station. An acknowledgement is sent from the mobile station to the base station, or from the base station to the relay station, when the packet is decoded successfully. Otherwise, a non-acknowledgement is sent indicating that the packet could not be successfully decoded. The method also includes identifying, at the base station, a first relay station ($RS_n$) which did not successfully receive and decode the packet. The base station then instructs a previous relay station ($RS_{n-1}$) to generate the H-ARQ attempt which was not successfully decoded by $RS_n$ and forwarding it to $RS_n$.

The present invention also provides, according to one embodiment, a wireless communication system. The wireless communication system includes a plurality of relay stations, a base station, and at least one mobile station. An H-ARQ attempt is forwarded from the base station or the at least one mobile station, through the relay stations, to the at least one mobile station or the base station. The base station is configured to identify a first relay station which did not successfully receive and decode the packet based on feedback information.

In addition, the invention provides, in one embodiment, a base station. The base station includes a transmitter configured to transmit an attempt to at least one relay station. The at least one relay station is configured to decode the attempt and forward the attempt to a mobile station. The base station further includes an identifying unit configured to identify, when the attempt was not successfully decoded, a first relay station that did not successfully receive and decode the attempt. The base station also includes an instructing unit configured to instruct a previous relay station to generate the attempt which was not successfully decoded and to forward the attempt to the first relay station that did not successfully receive and decode the attempt.

The present invention further provides, according to one embodiment, a wireless communication system. The wireless communication system includes means for sending an H-ARQ attempt from a base station, or a mobile station, to a relay station. The method further includes means for forwarding the attempt to a mobile station or base station and decoding the packet at the mobile station or base station. The method also includes means for identifying, at the base station, a first relay station ($RS_n$) which did not successfully receive and decode the packet, and means for instructing a previous relay station ($RS_{n-1}$) to generate the H-ARQ attempt which was not successfully decoded by $RS_n$ and forwarding it to $RS_n$.

The invention also provides, in one embodiment, a mobile station. The mobile station includes a transmitter configured to transmit an attempt to at least one relay station. The at least one relay station is configured to decode the attempt and forward the attempt to a base station. When the attempt was not successfully decoded, a first relay station that did not successfully receive and decode the attempt is identified. A previous relay station is then instructed to generate the attempt which was not successfully decoded and to forward the attempt to the first relay station that did not successfully receive and decode the attempt.

BRIEF DESCRIPTION OF THE DRAWINGS

For proper understanding of the invention, reference should be made to the accompanying drawings, wherein.

DETAILED DESCRIPTION OF THE PREFERRED EMBODIMENT(S)

The present invention provides an enhanced H-ARQ scheme that optimizes bandwidth utilization and spectrum efficiency. As discussed above, H-ARQ is a scheme that combines ARQ protocols with FEC schemes which are considered to be the best error-control techniques for wireless links.

Previously, when an H-ARQ attempt was not successfully received at the MS/SS due to error or loss, subsequent attempts would be sent until the MS/SS successfully decodes the packet and sends an acknowledgement. These subsequent H-ARQ attempts need to be transmitted over all the different links between the MS/SS and BS, thereby resulting in the re-allocation of bandwidth between the MS and BS despite the fact that some of the links may have already transferred the frame successfully.

According to embodiments of the present invention, on the other hand, when an H-ARQ attempt is unsuccessful due to loss or error over a hop between the BS and MS/SS, then only the first node in the hop chain that fails to decode the packet transmits another H-ARQ attempt. The BS determines the first node that fails on decoding based on the feedback information sent from the nodes on the path. The node previous to the failed node is then instructed to retransmit by the BS. Specific embodiments of the invention are discussed below.

FIG. 1 illustrates an example of a wireless communication system according to one embodiment of the invention. The wireless communication system includes a base station BS in communication with at least one mobile station MS and at least one relay station RS. The mobile station MS may then move such that it is in communication with the relay station RS. The relay station RS, in turn, may be in communication with at least one subscriber station SS.

Figure 8:
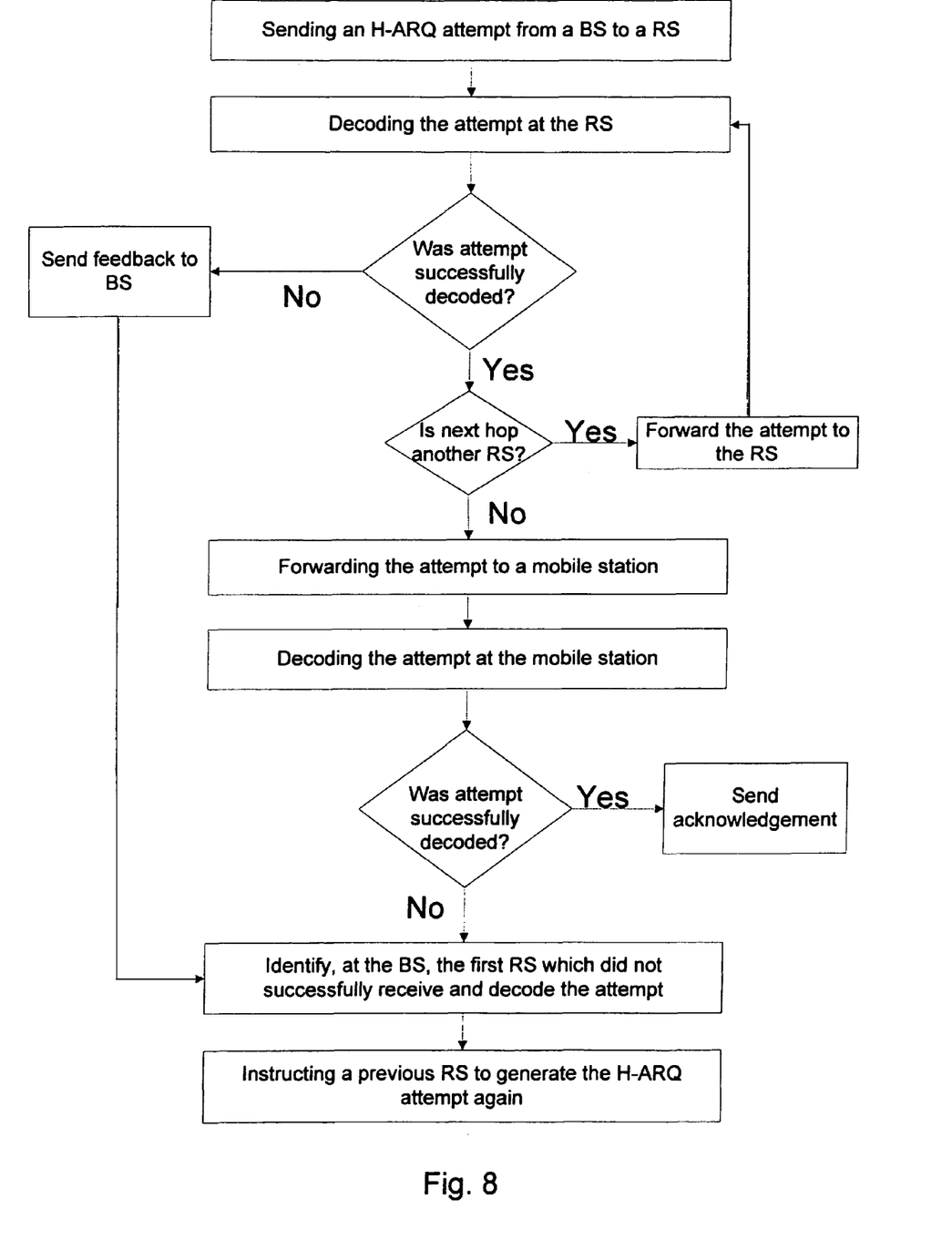
FIG. 8 illustrates a method of communication in a wireless network according to one embodiment of the invention.
Figure 10:
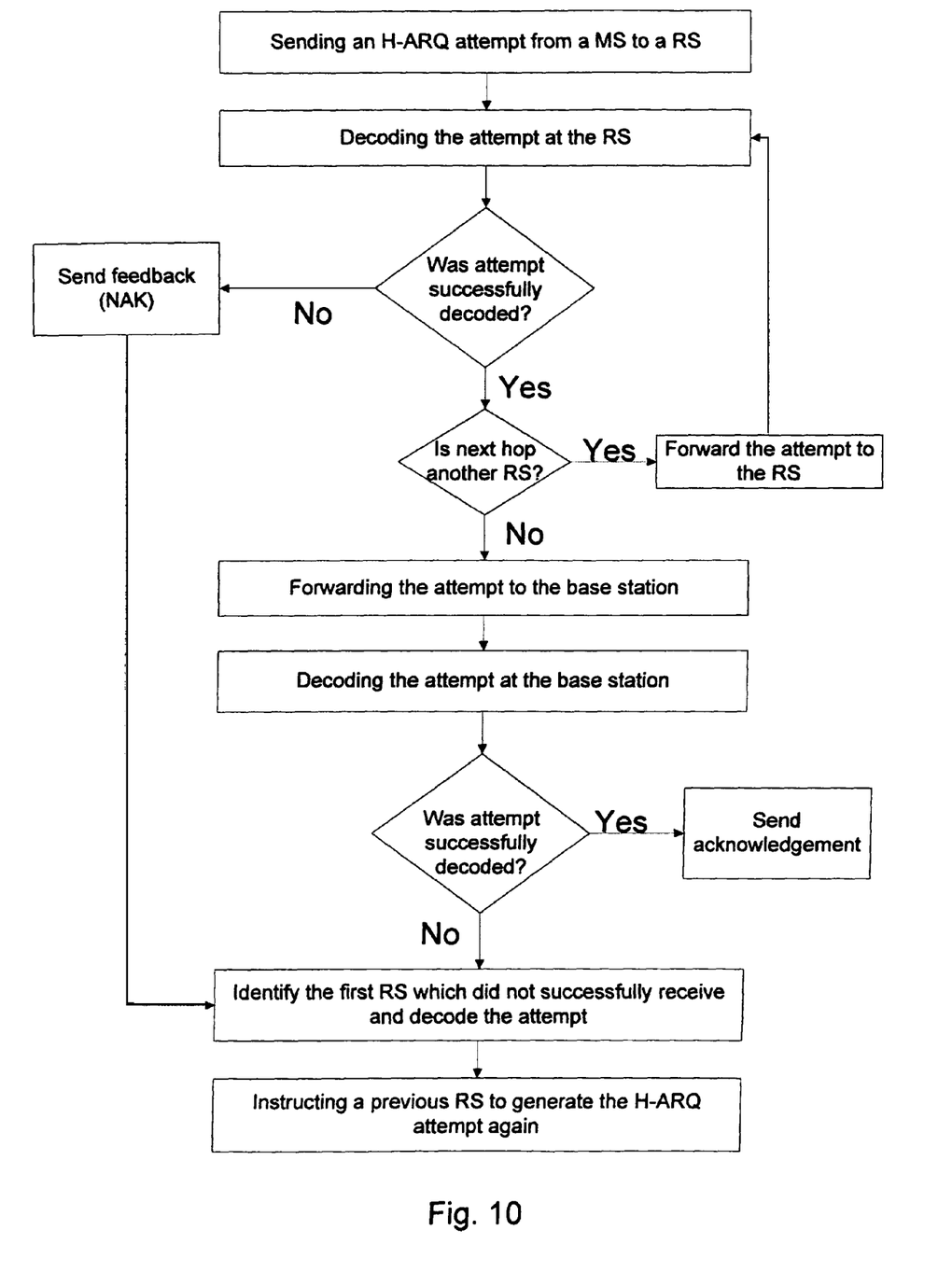
FIG. 10 illustrates a method of communication in a wireless network according to one embodiment of the invention.

FIGS. 8 and 10 illustrate examples of methods of communication in a wireless relay network, such as the one illustrated in FIG. 1. The methods include sending an H-ARQ attempt from a base station to a relay station, from a mobile station to a relay station, or between relay stations. The attempt may include a packet and the relay station makes an effort to decode the packet. The method further includes forwarding the attempt to a mobile station or base station and decoding the packet at the mobile station or base station. An acknowledgement is sent from the mobile station to the base station, or from the base station to the mobile station, when the packet is decoded successfully. Otherwise, a non-acknowledgement is sent indicating that the packet could not be successfully decoded. The method also includes identifying, at the base station, a first relay station ($RS_n$) which did not successfully receive and decode the packet based on feedback information sent from the relay stations. The base station then instructs a previous relay station ($RS_{n-1}$ in the downlink direction, or $RS_{n+1}$ in the uplink direction) to generate the H-ARQ attempt which was not successfully decoded by $RS_n$ and forwarding it to $RS_n$.

Figure 9:
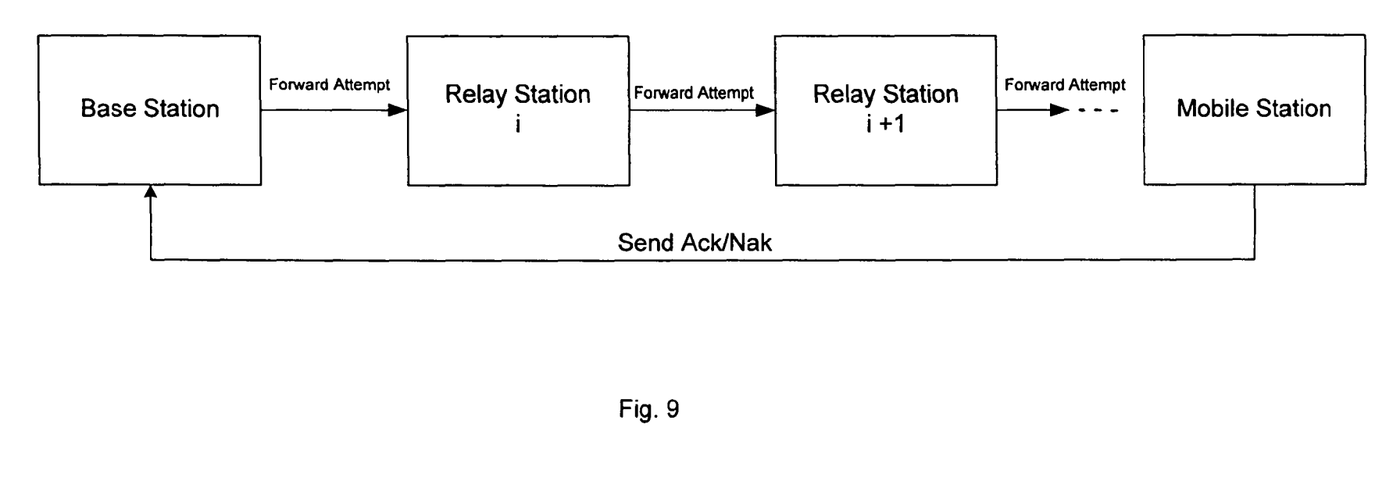
FIG. 9 illustrates a block diagram according to an embodiment of the invention.

FIG. 9 illustrates a block diagram of a system according to one example of the invention. The system includes a base station, a plurality of relay stations, and a mobile station. As mentioned above, according to an embodiment of the invention, the base station forwards an H-ARQ attempt to the first relay station. The H-ARQ attempt is then forwarded through the plurality of relay stations until reaching the mobile station. The mobile station sends an acknowledgement (ACK) when the packet is decoded successfully. When the packet is not successfully decoded, the mobile station sends a non-acknowledgement (NAK) to the base station.

Figure 11:
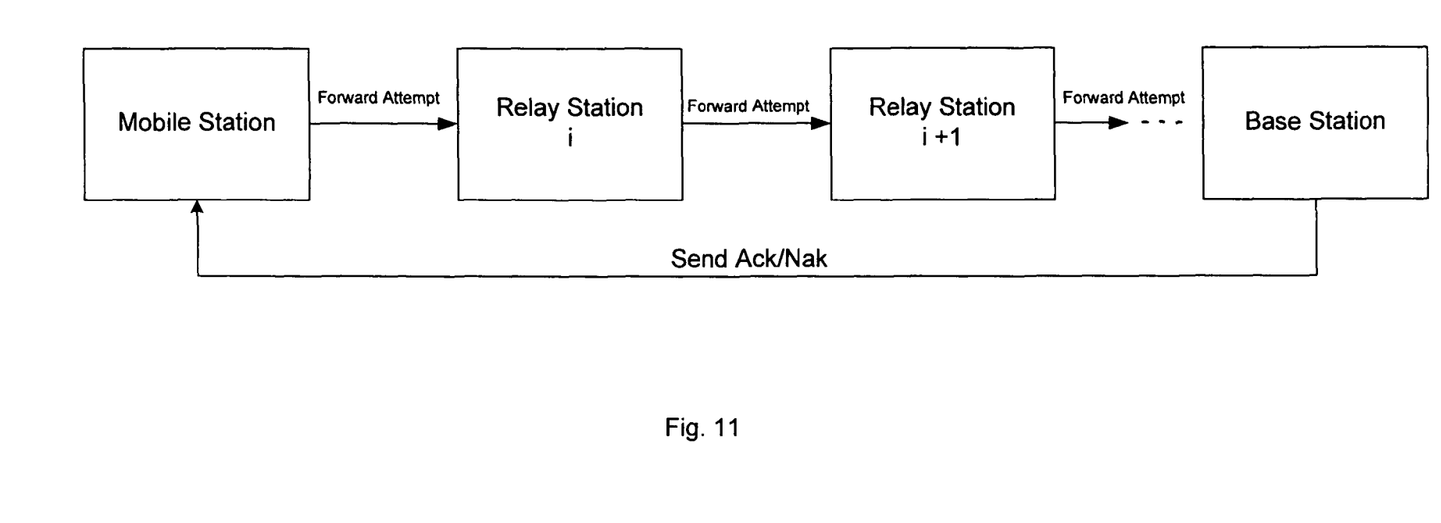
FIG. 11 illustrates a block diagram according to an embodiment of the invention.

Alternatively, as illustrated in FIG. 11, the H-ARQ attempt may be forwarded in the uplink direction. In other words, according to an embodiment of the invention, the mobile station forwards an H-ARQ attempt to the first relay station. The H-ARQ attempt is then forwarded through the plurality of relay stations until reaching the base station. The base station sends an acknowledgement (ACK) when the packet is decoded successfully. When the packet is not successfully decoded, the base station sends a non-acknowledgement (NAK) to the mobile station.

Figure 2:
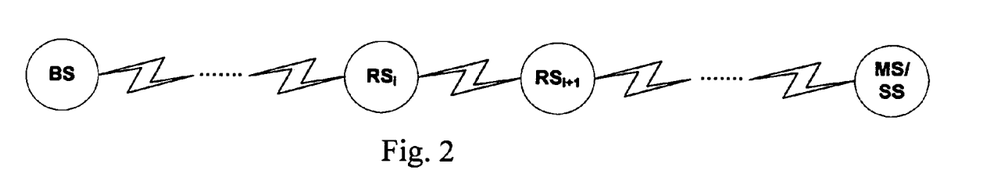
FIG. 2 illustrates an example of a relay network with one or multiple relay stations according to an embodiment of the invention.

FIG. 2 illustrates a relay network with one or multiple relay stations according to an embodiment of the invention. FIG. 2 assumes that there are n relay stations over the link between BS and MS. For the downlink traffic, H-ARQ attempt(s) are sent from $RS_i$ to $RS_{i+1}$. After receiving a H-ARQ attempt, $RS_{i+1}$ decodes the encoder packet based on previously received H-ARQ attempt(s) if the currently received H-ARQ attempt is not H-ARQ attempt 00. Otherwise, $RS_{i+1}$ decodes the H-ARQ attempt 00. If the packet is successfully decoded, an ACK is sent back to BS or $RS_i$ and the successfully decoded packet is restored by $RS_{i+1}$. Otherwise, a NAK is sent instead and $RS_{i+1}$ keeps a copy of the previously received H-ARQ attempt(s). The H-ARQ attempt, whether it is correctly decoded or not by $RS_i$, is forwarded by $RS_i$ to $RS_{i+1}$ until it reaches the MS/SS, which will send an ACK or NAK depending on the decoding result.

Alternatively, the H-ARQ may not be forwarded to the next hop, if it is not correctly decoded. Instead a null frame or some other indication is forwarded, if the bandwidth cannot be allocated for any other purpose.

Upon receiving the packet in the pre-assigned bandwidth, the MS/SS decodes the packet. If the MS/SS is not able to decode the packet correctly, it sends a NAK to the BS. Upon receiving a NAK from the MS/SS, based on the ACKs/NAKs received from the RSs, the BS is able to identify the first RS on the downlink path (assuming $RS_k$), which has not successfully received and decoded the packet. The manner in which the BS identifies such an RS will be discussed in greater detail below. The BS then instructs $RS_{k-1}$ to generate the H-ARQ attempts based on the PHY specification and sends the specified H-ARQ attempt to the MS/SS. Therefore, the BS does not need to resend the H-ARQ attempt from BS to $RS_{k-1}$, but only schedules the resources for sending specified H-ARQ attempt from $RS_{k-1}$ to the MS/SS. The same procedure described above is applied until the MS/SS successfully receives the packet. Once the MS/SS decodes the packet successfully, MS sends ACK back to the BS, and BS considers this packet as transmitted successfully.

Figure 3:
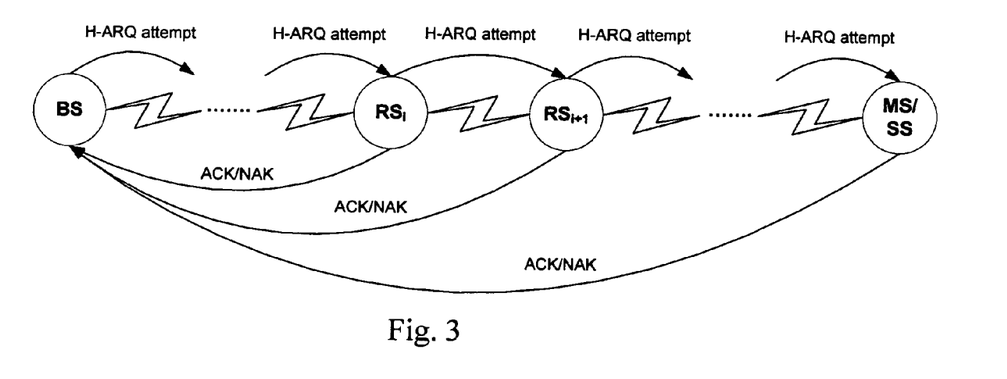
FIG. 3 illustrates an example of a relay network with enhanced H-ARQ according to an embodiment of the invention.

As mentioned above, there may be two approaches for the BS to identify the first RS over the downlink path, which has not received or successfully decoded the encoder packet. A first approach is illustrated in FIG. 3. As shown therein, whenever $RS_i$ receives a H-ARQ attempt, it sends ACK/NAK directly back to BS (i.e., the ACK/NAK is not processed by the RSs in between). The first RS on the downlink path from the BS to MS/SS, which sends a NAK or from which no feedback is received, is the first RS that has not received or successfully decoded the encoder packet. In order for the RSs to transmit the ACK/NAK, the BS needs to schedule uplink resources to carry such feedback information from all the $RS_i$ ($i \geq k$) whenever BS sends a H-ARQ attempt or instructs $RS_k$ to send a H-ARQ attempt as described above.

Figure 4:
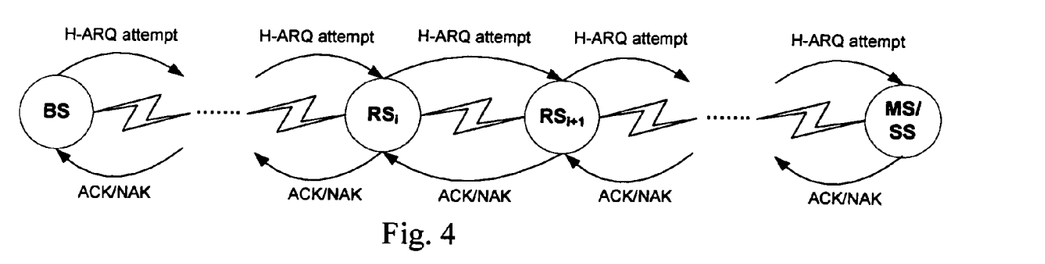
FIG. 4 illustrates another example of a relay network with enhanced H-ARQ according to an embodiment of the invention.

A second approach for the BS to identify the first RS which has not received or successfully decoded the encoder packet is illustrated in FIG. 4. As shown in FIG. 4, a H-ARQ attempt is generated from the BS or $RS_k$ and sent toward the MS/SS over the downlink path. The feedback (ACK/NAK) is generated from $RS_{i+1}$ (note: $RS_{n+1}$=MS/SS) and sent to $RS_i$ on the reverse path. If $RS_i$ was not able to decode the encoder packet, then $RS_i$ updates the feedback information from $RS_{i+1}$ indicating that the feedback is a NAK and $RS_i$ is the first node that did not successfully decode the encoder packet. The feedback information is propagated and updated over the reverse path from the MS/SS to $RS_k$. $RS_k$ then sends the feedback information directly to the BS. Based on such feedback information, the BS is then able to identify the first RS on the downlink path, which has not received or successfully decoded the encoder packet. This approach requires the BS to schedule the resource to carry the feedback information from MS/SS to $RS_k$ via all the RSs in between and directly from $RS_k$ to the BS.

For the uplink traffic, H-ARQ attempt(s) are sent from $RS_{i+1}$ to $RS_i$. After receiving a H-ARQ attempt, $RS_i$ decodes the encoder packet based on previously received H-ARQ attempt(s) if the currently received H-ARQ attempt is not H-ARQ attempt 00. Otherwise, $RS_i$ decode the H-ARQ attempt 00. If the packet is successfully decoded, an ACK is sent back to BS Otherwise, a NAK is sent instead and $RS_i$ keeps a copy of the previously received H-ARQ attempt(s). The H-ARQ attempt, whether it is successfully decoded or not by $RS_i$, is forwarded by $RS_i$ to $RS_{i-1}$ until it reaches the BS, which will send an ACK or NAK depending on the decoding result. Alternatively, the H-ARQ attempt may not be forwarded to the next hop if it is not correctly decoded, and instead a null frame or some other indication is forwarded, if the bandwidth cannot be allocated for any other purpose.

Upon receiving the packet in the pre-assigned bandwidth, the BS decodes the packet. If the BS is not able to decode the packet correctly, it sends a NAK to the MS. At the same time, based on the ACKs/NAKs received from the RSs, the BS is able to identify the first RS on the uplink path (assuming $RS_k$), which has not successfully received and decoded the packet. The manner in which the BS may identify such a RS is discussed in further detail below. The BS then instructs $RS_{k+1}$ to generate the H-ARQ attempts based on the PHY specification and sends the specified H-ARQ attempt to the BS. Therefore, the BS does not need to instruct MS/SS to send the H-ARQ attempt, but only schedules the resources for sending specified H-ARQ attempt from $RS_{k+1}$ to the BS. The same procedure described above is applied until the BS successfully receives the packet. The BS may send ACK back to the MS/SS after decoding the packet successfully or knowing $RS_{k+1}$ (if $RS_{k+1}$ !=MS/SS) decodes the packet successfully.

Figure 5:
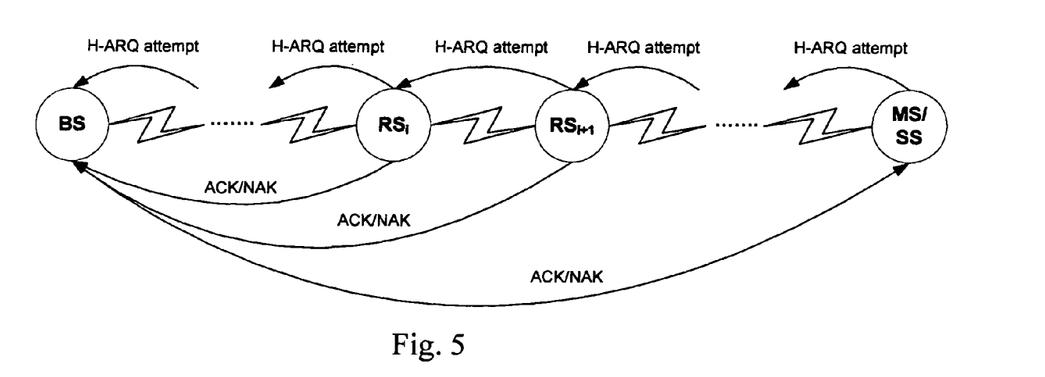
FIG. 5 illustrates an example of a relay network with enhanced H-ARQ according to an embodiment of the invention.

As mentioned above, there may be two approaches for the BS to identify the first RS over the uplink path, which has not received or successfully decoded the encoder packet. FIG. 5 illustrates a first approach. As shown in FIG. 5, whenever $RS_i$ receives a H-ARQ attempt over uplink and is not able to decode it successfully, it sends an ACK/NAK directly back to BS (i.e., the ACK/NAK is not processed by the RSs in between). The first RS on the uplink path from the MS/SS to the BS, which sends a NAK or from which no feedback is sent, is the first RS that has not received or successfully decoded the encoder packet. In order for the RSs to transmit the ACK/NAK, the BS needs to schedule uplink resource to carry such feedback information from all the $RS_i$ ($i \leq k$) whenever the BS sends a H-ARQ attempt or instructs $RS_k$ to send a H-ARQ attempt as described above.

Figure 6:
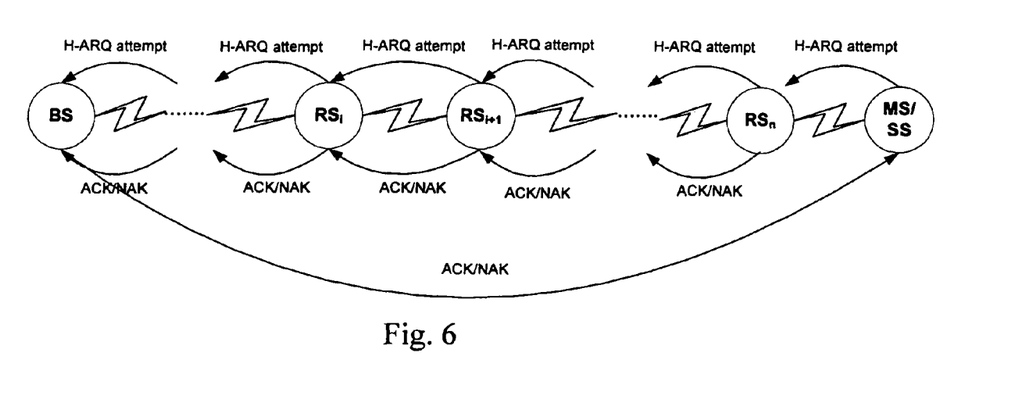
FIG. 6 illustrates an example of a relay network with enhanced H-ARQ according to an embodiment of the invention.

FIG. 6 illustrates a second approach for the BS to identify the first RS over the uplink path that has not received or successfully decoded the encoder packet. As shown in FIG. 6, a H-ARQ attempt is generated from MS/SS or $RS_k$ and sent toward the BS over the uplink path through the RSs. Two options may be available for transmitting the feedback information.

According to one embodiment of the invention, as illustrated in FIG. 6, upon receiving a H-ARQ attempt, $RS_{i+1}$ decodes the encoded packet and a feedback (ACK/NAK) is generated and sent to $RS_i$ on the uplink path. If $RS_{i+1}$ decodes the packet successfully, it may send a ACK to $RS_{i+2}$, which triggers $RS_{i+2}$ to clear the buffer of the stored packet. Assuming $RS_k$ is the first RS over the uplink path, which is not able to successfully decode the encoded packet. Then after finding out the failure of decoding and receiving the ACK from $RS_{k+1}$, $RS_k$ then updates the feedback information from $RS_{k+1}$ indicating that the feedback is a NAK and it is $RS_k$ that is not able to decode the packet. $RS_k$ then sends the NAK to $RS_{k-1}$. When $RS_{k-1}$ receives the NAK, it just forwards it to $RS_{k-2}$ until the NAK reaches the BS. This requires the BS to schedule the resources to carry the ACK/NAK between every two adjacent RSs on the uplink path starting from $RS_{k-1}$.

Figure 7:
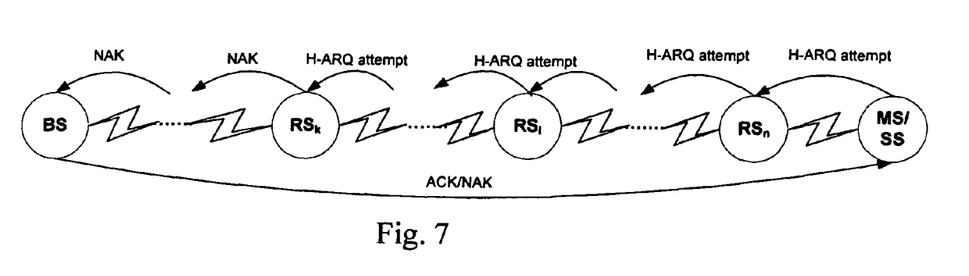
FIG. 7 illustrates an example of a relay network with enhanced H-ARQ according to an embodiment of the invention.

According to another embodiment of the present invention, as illustrated in FIG. 7, only the NAK is transmitted over the regular data traffic channel. Upon receiving a H-ARQ attempt, $RS_{i+1}$ decodes the encoded packet. If successful, $RS_{i+1}$ only sends the encoded packet to $RS_i$ without sending an ACK. Assuming $RS_k$ is the first RS over the uplink path, which is not able to successfully decode the encoded packet. Then after finding out the failure of decoding, $RS_k$ generates a NAK with indication that it is the first node that fails to decode the packet and sends it to $RS_{k-1}$. Since $RS_{k-1}$ will not forward the non-decoded packet to the next hop, it uses the traffic channel that was originally assigned to carry the H-ARQ attempt to carry the NAK and sends it to $RS_{k-2}$. Such a process continues until the NAK reaches the BS.

Regardless of which option is implemented, if the BS receives a NAK, then based on such feedback information, the BS is able to identify the first RS on the uplink path that has not received or successfully decoded the encoder packet.

Furthermore, certain embodiments of the present invention provide a method of carrying feedback information from the relay stations (RS) to the base station (BS) in 802.16 technology. The present invention provides several ways for carrying the feedback information in a downlink direction. According to one embodiment, the UL MAP allocates resources to carry the feedback (i.e., NAK) in the HARQ ACK Region delivered through the HARQ ACK Region Allocation IE or the Compact_UL_MAP_IE from each $RS_i$ ($i \geq k$) and MS.

One option for carrying feedback information in a downlink direction is for the UL MAP to allocate resources for every RS to either generate or propagate the feedback information to the previous RS. The feedback information contains ACK/NAK which is carried in the HARQ ACK Region delivered through the HARQ ACK Region Allocation IE, or the Compact_UL-MAP_IE and the RS IDs of the RSs that send the NAK and traffic direction for each frame acknowledged in the HARQ ACK Region.

Since the feedback from RSs for both uplink and downlink traffic is transmitted in the uplink direction, the RSs needs to know if the feedback is allocated for uplink traffic or the downlink traffic. If it is uplink, the feedback is associated with the uplink traffic carried in the same frame. If it is downlink, the feedback is associated with the downlink traffic transmitted before a fixed period defined by H-ARQ DL ACK delay offset. A Direction field may be included to indicate such information.

Note that for each of the frames, there will be one RS which is the first RS that is not able to decode the packet successfully. Therefore, the feedback information contains a block map. Each block contains one RS ID, which corresponds to the frame at the same location of the ACK bitmap in the ACK Channel Region. Possible approaches for indicating the location of the set of RS ids (i.e., a block map) in the UL MAP are listed below:

Approach 1:
Use Compact UL-MAP IE for extension for compact UL MAP case.

| Syntax | Size | Notes |
| --- | --- | --- |
| Compact_UL-MAP_IE( ){ | 3 bits | |
| UL-MAP Type = 7 | 5 bits | |
| UL-MAP subtype = 1 | 4 bits | Extension subtype for HARQ RS id indication (see section 6.3.2.3.43.7.7) |
| Length | 4 bits | Length of the IE in bytes |
| Direction = 1 | 1 bit | HARQ for Downlink traffic |
| OFDMA Symbol offset | 8 bits | |
| Subchannel offset | 7 bits | |
| No. OFDMA Symbols | 5 bits | |
| No. Subchannels | 4 bits | |
| } | | |

Approach 2:
Use Extended-2 UIUC in UL-MAP extended-2 IE for normal UL MAP case.

| Extended-2 Type | Usage |
| --- | --- |
| 00-08 | As defined currently |
| 09 | HARQ RS id Indication IE |
| 0A-0F | As defined currently |

The new HARQ RSID_Indication_IE is defined in the following table.

| Syntax | Size(bits) | Notes |
| --- | --- | --- |
| HARQ RSID_Indication_IE( ) | | |
| { | | |
| Extended-2 UIUC | 4 | HARQ_RSID_Indication_IE( ) = 0x09 |
| Length | 8 | |
| Direction = 1 | 1 bit | HARQ for Downlink traffic |
| OFDMA Symbol offset | 8 | |
| Subchannel offset | 7 | |
| No. OFDMA symbols | 5 | |
| No. subchannels | 4 | |
| } | | |

With respect to carrying feedback information in an uplink direction, the same approaches can be used as for the downlink direction but with the Direction field set to 0. Additionally, according to an embodiment of the invention, the RS ID in the feedback information can be carried using the traffic channel allocated for the HARQ data which is not sent due to unsuccessful decoding. In order to indicate whether the payload is regular traffic or RS ID information, the extended subheader can be used as shown below.

| ES type | Name | ES body size | Description |
| --- | --- | --- | --- |
| 0-5 | As defined currently | | |
| 6 | HARQ RSID Indication extended subheader | TBD (=size of RS id) | |
| 7-127 | As defined currently | | |

The format of HARQ RSID Indication extended subheader can be defined as shown below.

| Name | Size | Description |
| --- | --- | --- |
| HARQ RSID Indication extended subheader | TBD (=size of RS id) | The id of the RS that is the first RS in the RS chain, which is not able to successfully decode the frame. |

As a result of the various embodiments and examples described above, the present invention provides novel systems and methods for an improved H-ARQ scheme which provides better bandwidth utilization.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:

1. A method comprising:
sending an attempt from a base station to a plurality of relay stations;
receiving an acknowledgement from a mobile station when the attempt is successfully decoded by at least one relay station of the plurality of relay stations and the attempt is forwarded from the at least one relay station to the mobile station;
when the attempt is not successfully decoded, identifying a first relay station from the plurality of relay stations which did not successfully receive and decode the attempt, and instructing a previous relay station to generate and send the attempt that was not successfully decoded,
wherein the identifying comprises
receiving, at the base station, feedback information from the at least one relay station; and
identifying, at the base station, the first relay station which did not successfully receive and decode the attempt based on the feedback information received from the at least one relay station.

2. The method of claim 1, wherein the sending of the attempt comprises sending a hybrid automatic repeat request attempt.

3. The method of claim 2, wherein the sending of the attempt comprises sending a packet.

4. The method of claim 1, wherein the feedback information comprises an acknowledgment (ACK) or non-acknowledgment (NAK).

5. A method comprising:
sending an attempt from a mobile station to a plurality of relay stations;
receiving an acknowledgement from a base station when the attempt is successfully decoded by at least one relay station of the plurality of relay stations and the attempt is forwarded from the at least one relay station to the base station;
when the attempt is not successfully decoded, identifying a first relay station from the plurality of relay stations which did not successfully receive and decode the attempt, and
instructing a previous relay station to generate and send the attempt that was not successfully decoded,
wherein the identifying comprises
receiving, at the base station, feedback information from the at least one relay station; and identifying the first relay station which did not successfully receive and decode the attempt based on the feedback information received from the at least one relay station.

6. The method of claim 5, wherein the sending of the attempt comprises sending a hybrid automatic repeat request attempt.

7. The method of claim 5, wherein the sending of the attempt comprises sending a packet.

8. The method of claim 5, wherein, when the attempt is successfully decoded by the at least one relay station, the at least one relay station send an acknowledgment to a previous relay station in order to clear a buffer in the previous relay station.

9. A system comprising:
a plurality of relay stations;
a base station; and
at least one mobile station,
wherein an attempt is forwarded from the base station, through the relay stations, to the at least one mobile station, and
wherein the base station is configured to identify a first relay station which did not successfully receive and decode the attempt and to instruct a previous relay station to generate the attempt that was not successfully decoded,
wherein feedback information is sent from at least one relay station of the plurality of relay stations to the base station,
wherein the base station is configured to identify the first relay station which did not successfully receive and decode the attempt based on the feedback information received from the at least one relay station.

10. The system of claim 9, wherein the attempt comprises a hybrid automatic repeat request attempt.

11. The system of claim 9, wherein the attempt comprises a packet.

12. An apparatus comprising:
a transmitter configured to transmit an attempt to a plurality of relay stations;
a receiver configured to receive an acknowledgement from a mobile station when the attempt is successfully decoded by at least one relay station of the plurality of relay stations and the attempt is forwarded from the at least one relay station to the mobile station;
an identifying unit configured to identify, when the attempt was not successfully decoded, a first relay station from the plurality of relay stations that did not successfully receive and decode the attempt; and
an instructing unit configured to instruct a previous relay station to generate the attempt which was not successfully decoded and to forward the attempt to the first relay station that did not successfully receive and decode the attempt,
a receiver configured to receive feedback information from the at least one relay station,
wherein the apparatus is configured to identify the first relay station which did not successfully receive and decode the attempt based on the feedback information received from the at least one relay station.

13. The apparatus of claim 12, wherein the transmitter is configured to transmit a hybrid automatic repeat request attempt.

14. The apparatus of claim 12, wherein the transmitter is configured to transmit a packet.

15. A system comprising:
sending means for sending an attempt to a plurality of relay stations, wherein the plurality of relay stations are configured to decode the attempt and to forward the attempt;
receiving means for receiving an acknowledgement when the attempt is successfully decoded;
identifying means for identifying a first relay station from the plurality of relay stations which did not successfully receive and decode the attempt; and
instructing means for instructing a previous relay station to generate the attempt which was not successfully decoded by the first relay station and forwarding the attempt to the first relay station, receiving means for receiving feedback information from the plurality of relay stations, wherein the system is configured to identify the first relay station which did not successfully receive and decode the attempt based on the feedback information received from the plurality of relay stations.

* * * * *